Figure 4:
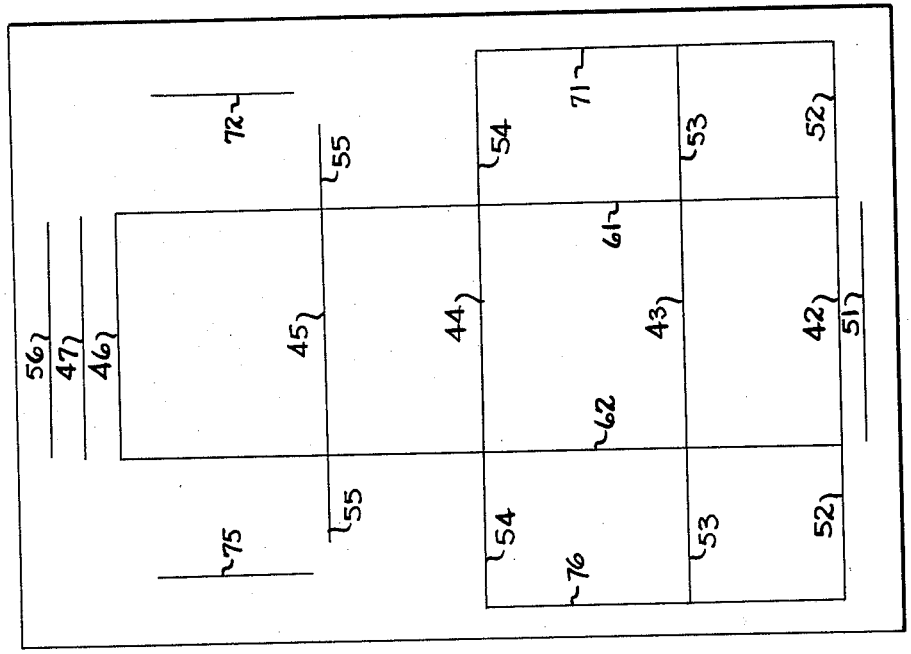

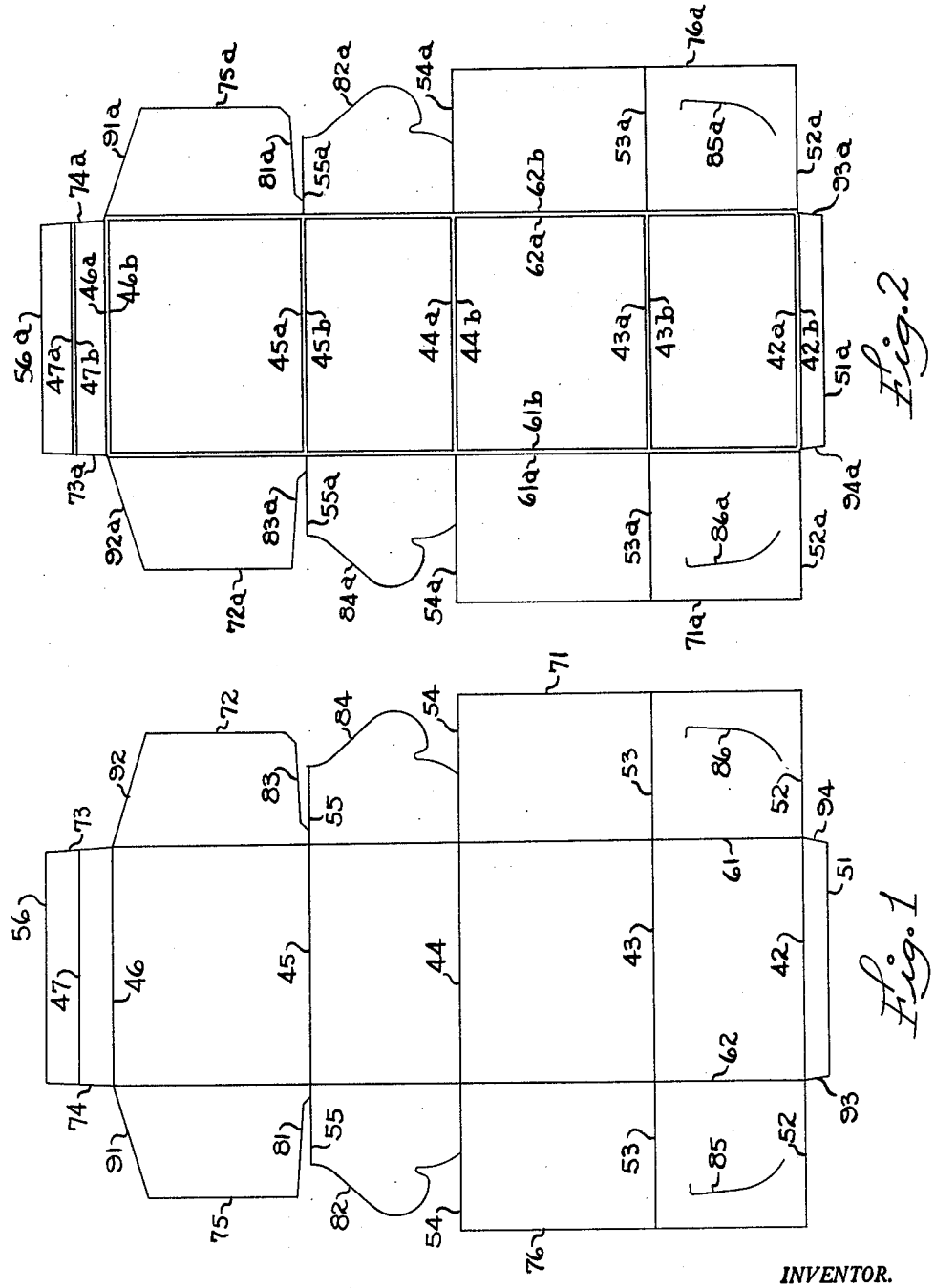

INVENTOR.
ROBERT H. DOWNIE

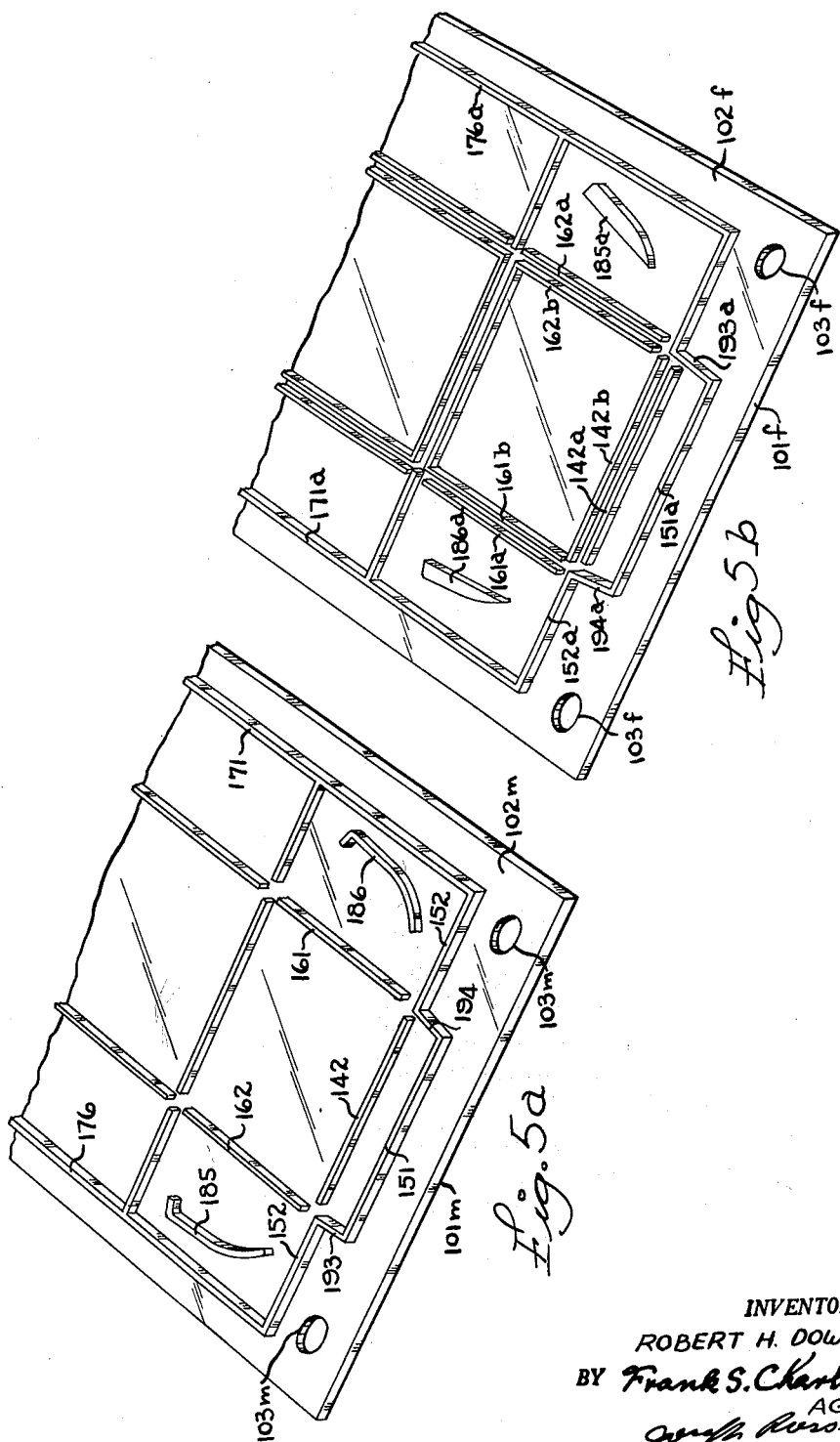

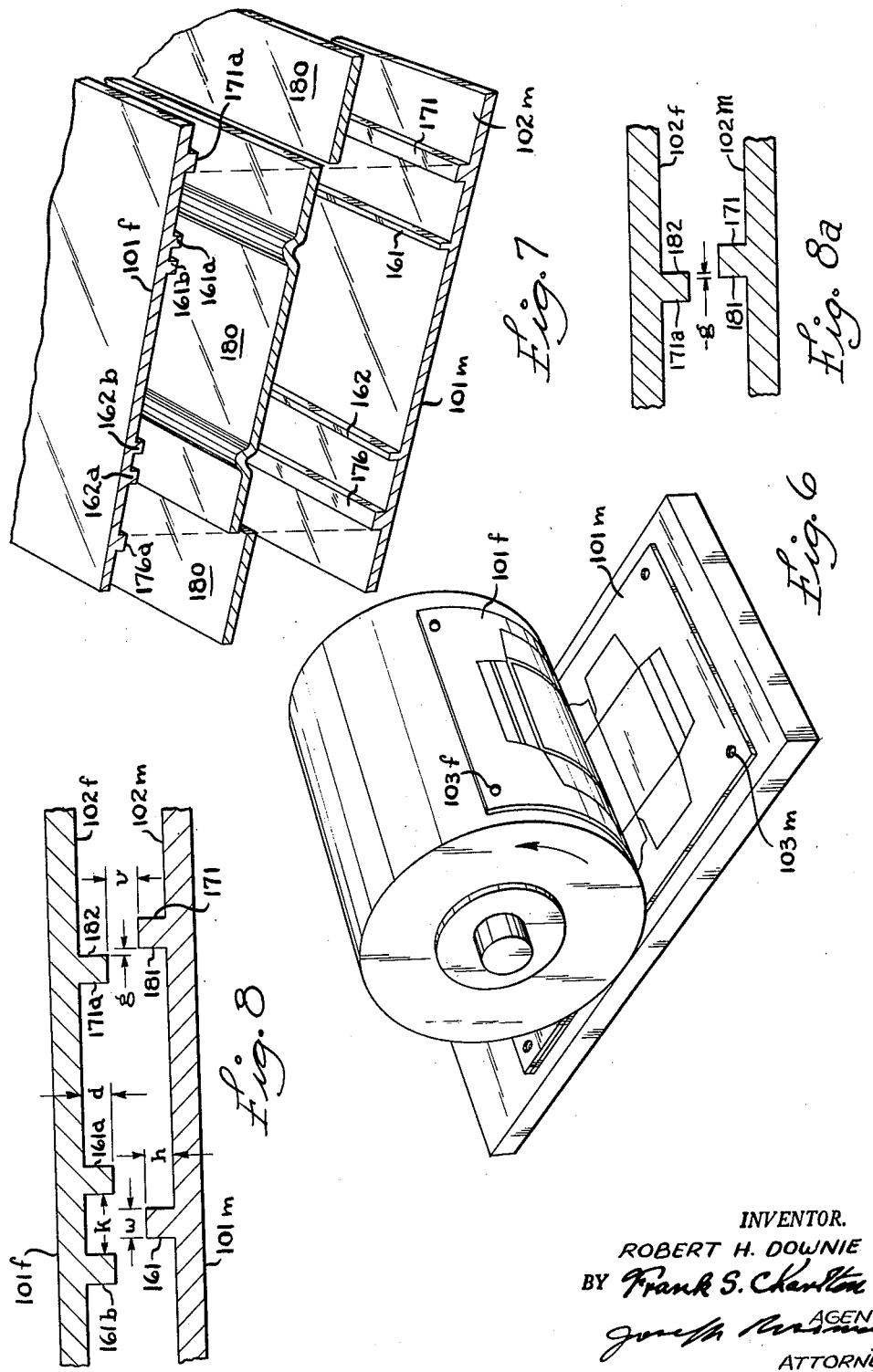

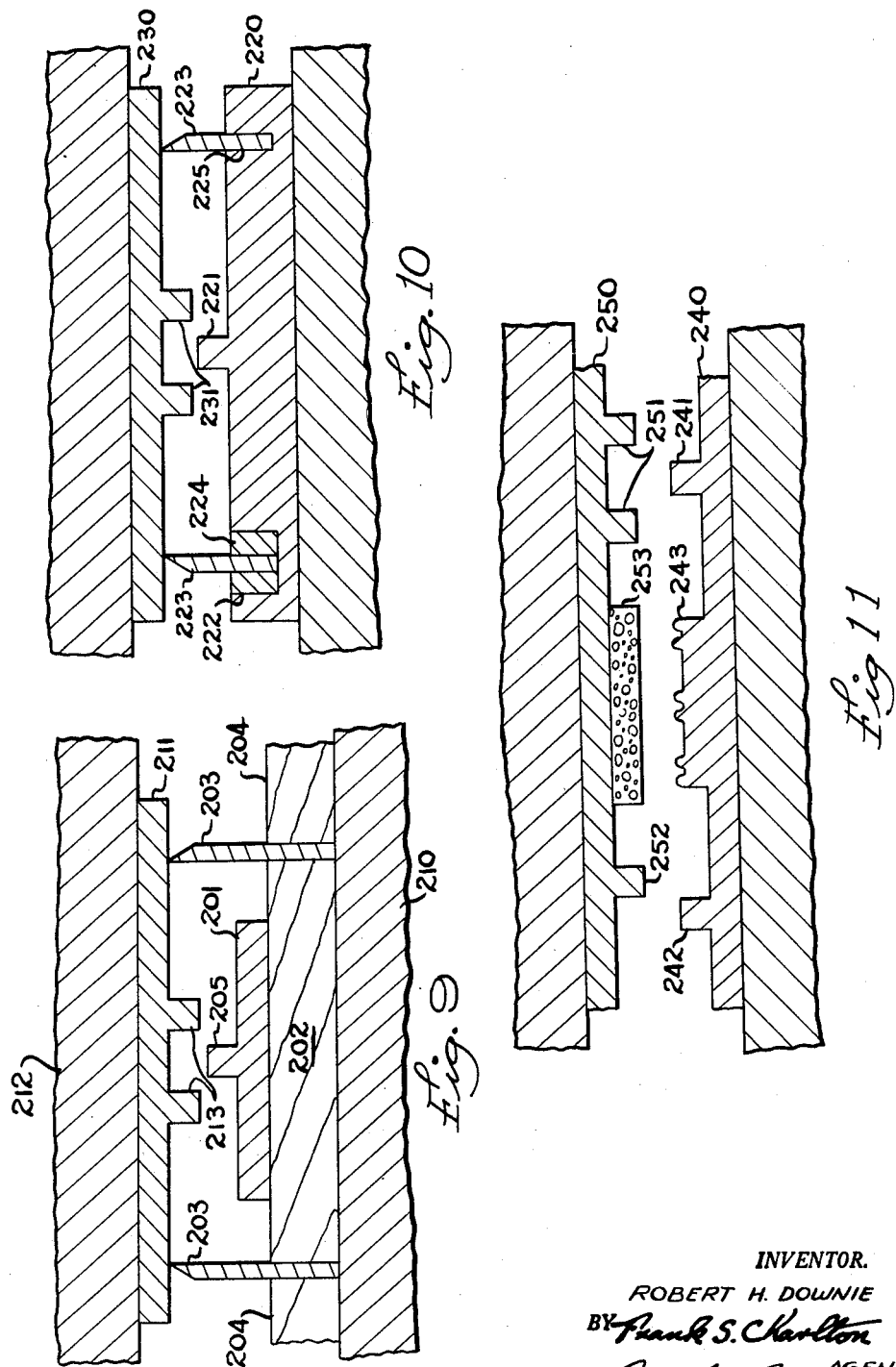

United States Patent Office 3,142,233
Patented July 28, 1964

3,142,233
CUTTING AND SCORING DIE
Robert H. Downie, Neenah, Wis., assignor to American Can Company, New York, N.Y., a corporation of New Jersey
Original application Mar. 20, 1961, Ser. No. 96,872. Divided and this application Aug. 2, 1962, Ser. No. 215,484
16 Claims. (Cl. 93—58)

This invention relates to new and improved cutting, scoring and embossing dies which are of particular value in the formation of paperboard carton blanks. This application is a division of Ser. No. 96,872, filed March 20, 1961, and now abandoned.

For many years, the cutting and scoring dies commonly used for the formation of carton blanks from paperboard have consisted of a series of individual cutting and scoring rules or knives, hand-formed to predetermined contours and held in frictional engagement between individually hand cut wooden blocks commonly referred to as "furniture," the rules extending above the upper surface of the blocks so that they will cut or crease a piece of paperboard superimposed on their exposed edges and subjected to downwardly exerted pressure. In common commercial practice, the wooden "furniture" blocks are ¾ in. in thickness and the knives range from .900 to 1.000 in. in height, so that the knives extend above the block surface by .150 to .250 inch. In preparing the die for operation in a press designed to stamp out carton blanks, the assembly of knives, rules and wooden blocks is locked in position on the press bed plate and the opposing press member, which may be a back up plate or cylinder, bearing a covering of a hard, heavy, counter paper, is brought into contact with the cutting and scoring die, thereby making on the counter paper an impression of the cutting and scoring rules in their proper spaced relationship. The counter paper is then manually cut away in the areas where the cutting and creasing rules registered an impression, thereby forming, in effect, a female counterpart of the male cutting and scoring rules in the counter paper.

Due to the many hand operations necessary for the preparation, assembly and corking of the knives, scoring rules and the wooden furniture of the male die and also the manual preparation of the femal counter paper counterpart thereof, this conventional die preparation and the press make-ready are extremely laborious, time-consuming and expensive. Furthermore, the accuracy with which carton blanks may be cut and scored with a die of this type depends equally on the skill and artistry with which the individual rules and knives are prepared and bent and the individual wooden furniture blocks are cut and fitted to form the male die, and the care with which the counter paper is manually grooved to co-act with the knives and rules of the male die. Since each piece of each die is individually and manually constructed, exact reproducibility between any two dies would be rare, indeed. The multitude of separate pieces, held together frictionally in a frame, are subject to various distortional stresses on the press and frequently become misaligned, resulting in unsatisfactory cutting and scoring of the paperboard stock and, on occasion, the entire die "pops" from the restraining frame and separates into its individual component parts, necessitating laborious re-assembly and press make-ready.

In the present invention, the assembly of individual blocks and rules constituting the male cutting and creasing die is replaced by a one-piece metallic plate bearing in extremely shallow relief on its upper surface a photographically registered representation of the male scoring and cutting elements, the main surface of the plate having been chemically etched away so that the scoring and cutting elements stand in slight relief. A complementary one-piece metallic female die is also provided which bears cutting elements and scoring elements which co-act with those of the male die to form the scores and cut-lines of the finished carton blank. These elements are also photo-composed and in very shallow relief to the chemically etched background surface of the metallic plate in much the same manner as previously mentioned regarding the male counterpart. Due to the extremely shallow relief, which may range from 0.005 in. to about 0.035 inch, the corking procedure necessary with conventional dies is completely eliminated and the paperboard stock is gripped and maintained planar during the cutting and scoring operations. The die elements of the present invention are adaptable for use on carton blank forming presses of the flat bed type, and on those having a flat bed with a rotating counter member as well as on presses in which both operating members rotate, as will be explained more fully hereinafter.

Figure 3:
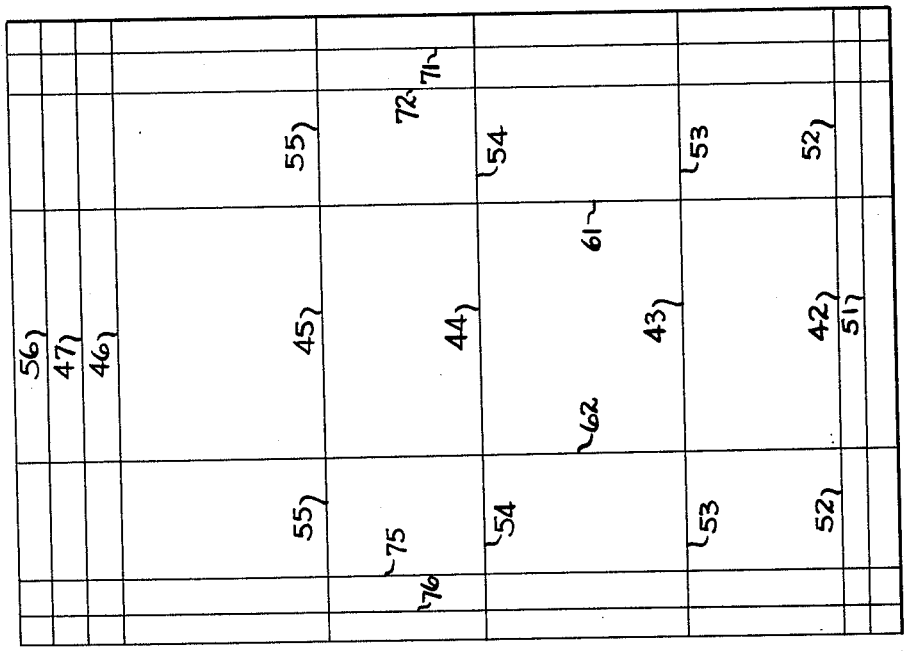

The principles of the present invention may be best understood from the following specification and accompanying drawings, in which:

FIGURE 1 is a plan view of a photographic positive to be used in the preparation of the male die plate according to this invention, FIGURE 2 is a plan view of a photographic positive to be used in the preparation of the complementary female die plate, FIGURE 3 is a plan view of a photo-composed line grid which is one step in the preparation of the positive of FIGURE 1, FIGURE 4 represents a further step in the preparation of the positive of FIGURE 1, FIGURE 5a and FIGURE 5b are enlarged perspective views of concomitant areas of finished male and female die plates, respectively, showing the integral raised cutting and scoring elements in very shallow relief above the etched plate background, FIGURE 6 is a perspective view showing the transfer of one of the die plates from registered position overlying the complementary die plate into operative position on the press back-up cylinder as a part of the press make-ready, FIGURE 7 is an exploded perspective view, showing the pair of die plates of FIGURES 5a and 5b, partially cut away, arranged for operation upon a sheet of paperboard placed therebetween, and showing the resulting cutting and scoring of the paperboard, FIGURE 8 is a greatly magnified cross-section view of a portion of male and female die plates in register, showing both a male and a female scoring element, and a concomitant pair of cutting members, FIGURE 8a is a modified view of a portion of FIGURE 8 showing a pair of cutting members, FIGURE 9 is an enlarged cross-sectional view of a male and female scoring die of the present invention utilized in conjunction with conventional cutting dies, FIGURE 10 is an enlarged cross-sectional view of a further modification of this invention, and FIGURE 11 is an enlarged cross-sectional view of a combined cutting, scoring and embossing die prepared according to the present invention.

My new and improved cutting and creasing dies are prepared by chemically etching two metallic plates bearing photo-composed images of complementary cutting and scoring elements in the form of a resist which prevents the etchant from attacking the metal in the image areas. For convenience, the two plates which together compose a cutting and scoring die will be herein designated as the male and female plates, respectively. The plates bearing the resist coating in the areas corresponding to the cutting and scoring elements of the dies may be prepared in a number of ways. For example, a master plan view drawing of the cutting and scoring elements for the male and female plates exactly as they are to appear in the finished die plate may be made and photographically imposed on the previously photosensitized metallic plates by known procedures. The plates subsequently may be etched after removal of the photosensitive resist from those areas of the plate not bearing the line images of the cutting and scoring elements.

The die plates may be made of any of a variety of etchable metals such as magnesium, copper, steel, bronze and the like, the choice of the particular metal to be utilized in a given case being determined by the relative importance of various factors such as durability, rapidity and ease of etching, flexibility, economy and other similar factors. The etching medium used will depend on the particular metal which is to be etched, satisfactory etchants for each of the metals listed as well as for other etchable metals being well known in the art. In general, magnesium is most often etched in an etchant bath composition based primarily on nitric acid while copper, steel and bronze are customarily etched with ferric chloride etchant compositions, although ammonium persulfate and other oxidizing etchants may also be used.

Similarly, the die plates may be of a photopolymerizable plastic composition such as photosensitized nylon or a photopolymerizable composition of a divinyl ester of polyethylene glycol or the like. The utilization of photopolymerizable plastic materials for the preparation of the die plates of my invention involves certain modifications of the basic process as applied to metals, such modifications being obvious to those skilled in the art.

My preferred method for preparing the new and improved cutting and scoring dies includes the formation of a photographic positive of the cut line and score line elements of the male die plate in predetermined spaced relationship to one another as shown in FIGURE 1 and in such manner that the photographic representation of each score line is of the exact width desired for the finished male scoring element. A corresponding photographic positive of the female die elements as shown in FIGURE 2 is similarly prepared. These photocomposed positives are preferably prepared on a dimensionally stable transparent base such as glass which is coated with a photographic emulsion and the positive images are later transferred to the metal die plates as will be later described.

In order to prepare the above positives, the photosensitive glass plate is exposed to a light slit of a width exactly corresponding to the desired scoring element width along a line corresponding to one of the score lines, for example, score line 42 in FIGURE 3, in the desired carton blank and, starting with this line, the light slit is then successively photomechanically stepped into each of the positions corresponding to the other carton score lines 43–47 inclusive, which are parallel to the first chosen score line. This procedure and the succeeding photomechanical steps may be carried out conveniently on a conventional photocomposing machine such as that built and sold by the Rutherford Machinery Division Sun Chemical Corporation, New York. Similarly, a light-slit photo image is produced corresponding to each of the straight cut lines 51–56, inclusive, parallel to the previously mentioned score lines in their proper spaced relationship. The glass plate is rotated 90° and the procedure repeated to obtain photo-images of the light slit corresponding to the score lines 61 and 62 and cut lines 71, 72, 75 and 76, which run perpendicular to the first set of cuts and scores.

Undesired portions of various of the lines in the resulting photo-image grid are mechanically or chemically removed by well known techniques resulting in the partial line grid of FIGURE 4, and images of the curved cut line elements 82, 84, 85 and 86, FIGURE 1, of the various carton locks, curved scores, angled scores and cut lines 73, 74, 81, 83, 91, 92, 93 and 94 and the like photomechanically stepped into their proper positions in the overall die layout. These images may conveniently be prepared by forming a photographic negative of a hand-drawn curved or angled line of proper shape and line width or by well-known scribing techniques. The resulting positive image is shown in FIGURE 1.

It should be noted that the light slit photo-images representative of the scoring rules are centered precisely on the desired score line positions in the final carton blank, while the cut line photo-images are so placed that one edge of the line image is immediately adjacent to the actual desired line of cut and may even overlie the line of cut by a few thousandths of an inch. Furthermore, although the width of the light slit is critical in the formation of the scoreline photo-image, it is not critical in forming the corresponding image of the cut line die element, which may be of any convenient width consistent with the limitations of available space and the requirements of adequate strength of the final cutting element to resist distortion and deformation.

The photographic positive of the female die plate elements shown in FIGURE 2 is prepared in a manner similar to that described for the male die positive, with certain distinctions dependent on the character of the female scoring elements. The photographic positive image of each female scoring element comprises a pair of lines, 42a and b 43a and b, etc., spaced an equal distance on each side of the line of desired creasing in the paperboard stock to be cut and creased. The distance between these line images of the female creasing die element is related to the thickness of the paperboard stock to be cut and scored by the finished die. Preferably this distance is between 2.0 and 4.0 times the paperboard stock thickness, 2.5 to 3.5 times such thickness being optimum. The line images are placed by photomechanically stepping the light slit one-half the desired distance in one direction away from the previously set position used in making the male scoring element image 42, 43, etc., in order to form image 42a, 43a, etc., and then stepping the light slit an equal distance on the other side of the position set for the male elements to form image 42b, 43b, etc., thus giving twin slit images, one on either side of the male die element image position and equidistant from it. The width of the female creasing element image lines is not critical, as was the male width, but they should be wide enough to give substantial strength to the final female creasing die element. I prefer that they be at least as wide as the image of the male creasing element image and may be of any desirable greater width consistent with the limitations of available space on the plate.

The photo images of the cutting members 51a, 52a, 53a, etc. which form a part of the female plate are photocomposed as described in the male plate image preparation, except that they lie adjacent to, but on the opposite side of the respective desired cut line positions from the cut line member images of the male plate positive. They, too, may, if desired, overlie the desired cut line position by a few thousandths of an inch.

Thus, when the male and female positives are superimposed in register, the male score line images are centered between the pairs of line images of the female scoring elements, and the cutting member images, in pairs, of which one member is part of the female positive and the other part of the male positive, will lie immediately adjacent to the desired cut line positions, one member being on the male positive and lying substantially entirely on one side of the cut line position and the other pair member being on the female positive and lying substantially entirely on the opposite side of the cut line position. Only a slight overlap of these two images is desirable or permissible, as will be explained in detail hereinafter.

The resulting, completely photocomposed photographic images of the male and female cutting and scoring elements are separately photographically transferred through the medium of suitable negatives, to separate sheets of a suitable etchable metal bearing a coating of a photosensitive resist. The exposed metal sheets are then developed and fixed in conventional manner and the resulting sheets, bearing a protective resist coating only in those areas corresponding to the cutting and scoring elements, are etched in a suitable etchant bath to a depth ranging from 0.005 to 0.035 inch depending on the stock to be cut and creased. The finished male and female die sheets will then bear the cutting and scoring elements in very shallow relief on the thin, flexible metallic plates.

If the basic material constituting the die plate is a photopolymerizable plastic such as nylon or a polyethylene glycol divinyl ester composition, for example, the photo composed image of the cutting and scoring elements is transferred through the medium of suitable negatives directly onto the surface of the photosensitive plastic sheet which is then developed and hardened by conventional processes for treating the particular photopolymerizable plastic material utilized.

As represented in FIGURES 5a and 5b, which show concomitant sections of finished male and female plates, respectively, the male die plate, designated generally by the number 101m has integral raised portions constituting male scoring elements 161, 162 and 142 and cutting members 151, 193, 194, 152, 171, 176, 185 and 186 in shallow relief above the etched background 102m. Plate 101m also bears registration apertures 103m mechanically drilled in the plate at points corresponding to previously photographically imposed register marks. Similarly, the female die plate 101f bears paired female scoring elements 161a and 161b, 162a and 162b, and 142a and 142b as well as cutting members 151a, 193a, 194a, 152a, 171a, 176a, 185a and 186a and register apertures 103b, drilled in the plate at points corresponding to previously photographically imposed register marks. Upon inversion of the female plate 101F into superposition on male plate 101m with respective paired marks 103m and 103f (and similar pairs of register apertures in other sections of the plates) in register, the male and female scoring elements and the respective pairs of cutting members will be positioned for cutting and scoring operations in conjunction with each other.

In assembling the die in a press preparatory to its use in cutting and scoring of, for example, carton blanks of paperboard, one of the pair of complementary die plates is placed in proper position on the bed plate or base cylinder of the press and secured there by a suitable adhesive, or by clamps or other conventional means, and the complementary die plate brought into register on top of the first plate. A suitable adhesive is then applied either to the exposed back face of the overlying die plate or to the back-up or opposing press member, or both, and the press is then placed on impression, whereby the second die plate becomes adhesively secured to the back-up or opposing press member, which may be either a flat plate or a rotating cylinder. The die plate transfer, being made under the dynamic operating conditions of the press, results in a very rapid make-ready with the two die plates in perfect register. FIGURE 6 shows the make-ready on the press in process of transfer of the die plate to the back-up cylinder, and FIGURE 7 shows the action of the cutting and scoring elements on a piece of paperboard 180 placed therebetween.

In practice, I have found that a double-sided pressure sensitive cellophane tape applied to the back side of the overlying die plate serves as a very satisfactory medium for effecting the transfer and adhesion of this plate to the backup or opposing press member. This in-register die transfer process is equally applicable to presses having a flat back-up plate or a rotating back-up cylinder, since the metallic die plate may be made thin enough to be sufficiently flexible to accommodate itself to either a flat or curved surface to become adhered securely to either type of press member and will remain adhered thereto under all normal press operating conditions. The thinness and consequent light weight of the die plate make it possible to maintain its adhered position in perfect register on the back-up cylinder of a press even when operating at high rotational speeds. Of course, if the plate is to be adhered to a flat press member, it need not be so thin as to be readily flexed.

In contrast to the conventional carton cutting and scoring dies in which the cutting and scoring rules are separate units maintained in their proper spaced relationship only by frictional engagement with the intervening furniture, the cutting and scoring elements of the dies of the present invention are integral parts of the die plate itself. Every element of the plate is proportioned and positioned with the extreme accuracy possible in photographic reproduction and is permanently constrained to a position of perfect register with concomitant elements. This has, for the first time, made possible the preparation of cutting and scoring dies in which the dimensions and spacial relationships of the various cutting and scoring elements may be precisely tailored to obtain the optimum efficiency in cutting and scoring operations for the particular type and caliper of paperboard stock to be formed into carton blanks. Furthermore, since the die elements are photographically composed, any number of die plates may be produced which are absolutely identical. This perfect reproducibility of the die plates constitutes a very important advantage of my invention.

I have found that the height of the male scoring element, the width of the male scoring element, the width of the groove in the female scoring element and the depth of the female groove are all factors which influence the quality of a score which is formed in a paperboard sheet. These factors are also related to the particular type and caliper of the paperboard being processed.

To obtain satisfactory score lines in paperboard, the height, $h$, in FIGURE 8, of the male scoring element 161 should range from about 0.005 inch to 0.035 inch above the die plate background, depending on the caliper of the paperboard being processed, and preferably the height of the male scoring element 161 should be between 0.5 and 1.1 times the paperboard stock thickness. The optimum height of the male scoring element is approximately 0.8 times the thickness of the paperboard stock. For example, the optimum male scoring element height, $h$, for scoring paperboard of 0.010 inch thickness was found to be 0.008 inch, for 0.017 inch thick paperboard about 0.015 inch and for 0.026 inch thick paperboard about 0.022 inch.

The width, $w$, in FIGURE 8, of the male scoring element 161 may range from about 0.5 to 2.0 times the paperboard thickness while the optimum width has been found to be from about 0.8 to 1.2 times the paperboard thickness, and satisfactory results have been obtained when the width $k$, of the groove between the paired raised portions 161a and 161b of the female scoring element ranges from about 2.0 to about 4.0 times the thickness of the paperboard being processed, 2.5 to 3.5 times such thickness being optimum. This groove width corresponds to the width, $w$, of the male scoring element 161 plus 1.5 to 2.5 times the paperboard stock thickness. The depth $d$ of the groove between the raised portions 161a and 161b may suitably range between about 0.5 and 1.5 times the paperboard stock thickness or even slightly deeper, although greater depth presents no additional advantage. The female groove depth should preferably be at least substantially equivalent to the height, $h$, of the male scoring element 161.

The vertical gap, $v$, between the plates (that is, the vertical distance between the raised portion of the male die plate and the raised portion of the female die plate when the press is on impression) exerts considerable influence on the operation of the cutting elements. A further, closely related factor is the horizontal gap, $g$, or lateral distance between the co-acting cutting edges 181 and 182 of the pair of cutting members, 171 and 171a, one of which is integral with the male die plate and the other integral with the female die plate.

I have found that in order to obtain satisfactorily clean and accurate cut lines in paperboard stock using the cutting dies of my invention, it is necessary that the horizontal gap, $g$, between the cutting eges 181 and 182 of the cutting members be no greater than about 20% of the paperboard stock thickness, as shown in FIGURE 8, and quite satisfactory cut lines may be obtained if the cutting members overlap to a small degree, which as shown in FIGURE 8a, should not normally exceed about 50% of the paperboard stock thickness. That is, when paperboard of 0.010 inch thickness is to be cut and scored, the horizontal gap, $g$, between the cutting members, when in operating position in the press, should fall in the range between −0.005 inch (indicating a combined overlap of the cutting members of 0.005 inch) and +0.002 inch. For cutting paperboard of 0.016 inch caliper, the horizontal gap should be between −0.08 and +0.003 inch. The desired gap range for cutting 0.025 caliper paperboard will be between −0.012 and +0.005 inch, and a corresponding relationship will be found for paperboard of other thicknesses.

The vertical gap, $v$, between the male and female die plates when the press is on impression may range from a slight overlap which results in true shear cutting to a positive gap of up to about 50% of the thickness of the paperboard stock being cut. It is, of course, impossible to operate under the special condition wherein the cutting elements overlap both horizontally and vertically so that both $g$ and $v$ have negative values.

The preferred combination of horizontal and vertical relationships between cutting members for producing a clean cut in paperboard of a variety of thicknesses combines a vertical gap of 0.003 to 0.005 inch with a horizontal overlap of 0.002 to 0.004 inch. That is, when the press is on impression, the vertical distance between the cutting members of the die is between 0.003 and 0.005 inch and the cutting members overlap horizontally by 0.002 to 0.004 inch, each cutting edge overlapping the actual desired line of cut by 0.001 to 0.002 inch.

The combined cutting and scoring die plates of my invention may be of varying thickness depending on the particular type of press on which they are to be utilized and on the caliper and character of the paperboard stock which is to be cut and scored.

The minimum practical thickness of the die plates is about 0.005 in. greater than the height of the scoring and cutting elements above the etched background. Thus, for use in cutting and creasing of 0.010 in. thick paperboard, the overall die plate thickness may be as little as about 0.013 inch. For cutting and scoring of 0.017 in. thick paperboard, the overall die plate thickness may range upward from about 0.02 in. and plate thicknesses above about 0.026 in. are satisfactory for preparation of dies for cutting and scoring of 0.026 in. thick paperboard assuming in each case an etch depth of about 0.8 times the thickness of the paperboards being processed. Similar relationships exist for paperboard of other thicknesses. It will be noted that my cutting and scoring dies may be very much thinner and consequently more flexible than conventional cutting and scoring dies made from an assembly of individual rules and furniture blocks, a maximum plate thickness of 0.04 in. being ample to provide cutting and scoring elements of optimum dimensions for all normal operations on even very heavy paperboard stock. In general, it is desirable from the standpoints of economy and utility to use die plates of near-minimum thickness. The very thin plates of my invention are sufficiently light in weight to be adhesively secured to either flat or cylindrical press members without the necessity of clamps or screws. The lightness and flexibility of these plates makes possible the unique method of press make-ready, previously described, in which in-register positioning of the die plates is obtained under the dynamic operating conditions of the press. This is of particular value in presses in which at least one of the main operating members is a rotating cylinder. Die plates which are to rest on flat surfaces may be of greater thickness, since flexibility is not a factor in these cases and it may, on occasion, be desirable to use plates of 0.5 in. to 1.0 in. or more in thickness or to build up the thickness of a thinner die plate by adhering it to a backing material of metal, plastic, wood or the like. On presses which combine a flat bed plate member with a cylindrical member, it is often convenient to utilize one die plate of minimum or near-minimum thickness on the cylinder and a somewhat thicker matching die plate on the flat bed, where flexibility is not a factor.

Various modifications of my invention may be made and the several embodiments thereof are considered within the spirit of the invention and dies may be constructed which embody either cutting or scoring elements, singly, rather than in combination as previously described. For example, scoring dies consisting of concomitant male and female die plates may be prepared according to the process of my invention hereinbefore described. One of the pair of plates, for example, the male plate, may be of suitable thickness so that on assembly with conventional furniture and cutting rules, the raised portions of the shallow-etched plate are at proper operating level with the conventional units. Alternatively, as illustrated in cross-section FIGURE 9, the male scoring die plate may be a thin, shallowly etched plate 201 which is suitably increased in thickness by being adhesively secured to a base of suitable thickness of wood, metal, plastic or other material as indicated by number 202 and thereafter assembled, together with conventional cutting knives 203 and furniture blocks 204, in a standard chase or frame to yield a composite male cutting and scoring die in which the cutting elements are conventional individual cutting rules 203 frictionally held between conventional furniture blocks 204 and the male scoring elements 205 are the raised portions integral with the etched metal plate 201 prepared as hereinbefore described. In the press make-ready, the composite male cutting and scoring die is secured on the bed plate 210, the female scoring die plate 211 is superimposed in register on the male scoring plate 201, double sided adhesive tape is placed on the exposed female back surface, and the press placed on impression, effecting the in-register transfer of the female scoring die to the press back-up member 212, which may be a plate or cylinder. Scoring of paperboard stock is then effected between the male scoring elements 205 and the female scoring elements 213, while cutting is accomplished by the conventional cutting knives 203 operating against the etched portion of the female scoring die 211 or against the cylinder jacket itself.

In another modification of my invention, illustrated in cross section in FIGURE 10, the etched male scoring die plate 220 prepared as hereinbefore described may bear, in addition to the raised male scoring elements 221 prepared as hereinbefore described, machine routed grooves 222 of a width and depth and in proper spaced relationship to accept individual cutting rules 223 which may be inserted in the routed grooves and affixed in desired cutting position by filling the groove surrounding the cutting rule 223 with a self-hardening plastic 224 or a molten metal which sets on cooling. Alternatively, the cutting rules 223 may be of a width to fit snugly in a machine routed groove 225 and to be therein retained by friction with the sides of the groove or by peening the plate metal into tight frictional engagement with the cutting rule. The co-acting female die plate 230 in this modification would contain only the female scoring elements 231, cut-lines being made by the conventional individual cutting rules 223 acting against etched areas of the female die plate or on the press cylinder jacket itself.

The principles of my invention may be utilized to prepare dies which incorporate means for cut-scoring and perforating as well as conventional cutting and scoring as hereinbefore described. In a further modification of my invention, embossing may similarly be accomplished, simultaneously with cutting and scoring.

In preparing a die suitable for embossing, as well as cutting and scoring a male positive of the photo-composed male scoring elements and cutting members is prepared as illustrated in FIGURES 1 through 4 and previously described. A photo-image of the male embossing elements of any desired embossing design is then imposed on the male positive bearing the scoring element and cutting member images. The resulting composite positive, bearing male scoring element images, embossing element images and cutting member images, is then transferred, through the medium of a suitable negative, to a photo sensitized etchable die plate which is subsequently developed and etched as previously described. The finished male embossing, cutting and scoring die plate will contain the male elements necessary for each of these operations, all of these elements being in very shallow relief on the plate. As shown in cross-section in FIGURE 11, the male die 240 contains male scoring elements 241, cutting element 242 and embossing element 243.

The female die plate 250, as shown in cross-section in FIGURE 11, is prepared in the manner previously described for cutting and scoring die plates. The resulting female plate will have female scoring elements 251 and cutting member 252 in shallow relief above the etched plate background. To the etched background of the female plate, in those areas corresponding to the embossing elements 243 on the male die plate 240, a thin sheet of cork 253 or similarly resilient material is attached, suitably by double-sided adhesive tape. Alternatively, the female plate background may be cut away in this area, and the resilient material attached directly to the base cylinder of the press itself. The thickness of the cork should be sufficient to bring its exposed surface substantially level with the upper surface of the cutting and scoring elements.

In operation on the press, the cutting and scoring elements function in the manner previously described and the male embossing element 243, operating in conjunction with the resilient insert 253 in the female die plate 250, impresses the desired embossed design on the paperboard stock.

Various other modifications of the die-forming process herein described will suggest themselves to those skilled in the art, and it is not intended that the scope of the invention be limited except as necessitated by the appended claims.

I claim:

1. A cutting and scoring die for working a sheet material, said die being adapted to be mounted in a suitable press and comprising a pair of opposed co-acting die members, each member of said pair being all of one homogeneous piece and including in shallow relief on the working surface thereof working elements forming a predetermined pattern in permanent fixed position to co-act with corresponding working elements on the other member of said pair, the working elements on one of said die members including a male scoring element comprising a raised portion corresponding precisely to a crease line to be formed in the sheet material, the working elements on the other of said die members including a female scoring element comprising a spaced pair of raised portions defining a groove precisely positioned to co-act with said male scoring element when mounted in a press, said working elements also including a cutting element comprising a raised portion on one of said die members corresponding to a desired cut line in the sheet material to be worked and having the longitudinal axis thereof slightly displaced to one side of said desired cut line and a corresponding co-acting cutting element comprising a raised portion on the other of said die members having its longitudinal axis slightly displaced to the opposite side of said desired cut line, said cutting elements being precisely aligned and positioned to co-act to cut said sheet material.

2. A cutting and scoring die according to claim 1 wherein said die members are of metal.

3. A cutting and scoring die according to claim 2 wherein at least one of the die members is a thin, flexible sheet.

4. A cutting and scoring die according to claim 1 wherein at least one of said die members is of organic polymeric material.

5. A cutting and scoring die according to claim 1 the raised portions on each of said die members lie in a relief plane between 0.005 and 0.035 inch above the adjacent surface of the die member.

6. A cutting and scoring die according to claim 1 wherein the overall thickness of at least one of the members is less than about 0.04 inch.

7. A die for scoring a paperboard sheet, said die being adapted for mounting in a die press and comprising a matched pair of die plates, each of said plates being formed all in one homogeneous piece and including on one surface thereof in very shallow relief working elements forming a predetermined pattern in precise register to co-act with the working members of the other of said matched pair of plates, the working elements on one of said plates including a male scoring element comprising a raised portion corresponding to a score line to be impressed in the paperboard sheet, said raised portion having a height between about 0.5 and 1.1 times the thickness of the paperboard to be scored and a width between about 0.5 and 2.0 times the paperboard thickness, the working elements of the other of said plates including a female scoring element comprising a spaced pair of raised portions defining a groove positioned to co-act with said male scoring element when mounted in a press, said groove being of a width between about 2.0 and 4.0 times the thickness of the paperboard and a depth between about 0.5 and 1.5 times the paperboard thickness.

8. A die according to claim 7 wherein said die plates are of metal.

9. A die according to claim 8 wherein the overall plate thickness of at least one of said die plates is less than about 0.04 inch.

10. A die for forming a cut line pattern in a paperboard sheet, said die comprising a matched pair of co-acting die members adapted to be mounted in a die press, each of said die members being all of one homogeneous piece and having formed in very shallow relief on one surface thereof a working element in precise register to co-act with a working element on the other of said die members, the working element of one of said die members comprising a raised portion in the form of a land having a cutting edge thereon, said raised portion constituting the first of a pair of cutting members which pair together comprise a cutting element corresponding to a proposed cut line in said paperboard sheet, the working element of the other of said plates also comprising a raised portion in the form of a land having a cutting edge thereon, said latter raised portion constituting the second of said pair of cutting members, said cutting members being positioned on the respective die members and the die members adapted to be mounted in a press so that the cutting edges lie adjacent to the position of the proposed cut line and have their respective longitudinal axes slightly displaced on opposite sides of the position of the proposed cut line to such an extent that the raised portions are positioned horizontally with respect to each other between a spacing of about 0.2 times the thickness of the paperboard sheet and an overlap of about 0.5 times such thickness.

11. A die according to claim 10 wherein said raised portions the the horizontal relationship with respect to each other are positioned to overlap to the extent of between about 0.002 and 0.004 inch.

12. A die for forming a predetermined pattern of lines of severance in a sheet material, said die being adapted for mounting in a die press and comprising a pair of co-acting die members, each of said members being all of one homogeneous piece and including sheet-severing elements in the form of lands standing in very shallow relief above the immediately adjacent areas of the die member, said sheet-severing elements being disposed along the lines where the sheet material is to be severed and so positioned on the respective die members that when the die is in operating position a minor portion of a sheet-severing element on one of said members overlies a minor portion of a co-acting sheet severing element on the other of said members.

13. A die according to claim 12 wherein the extent of such overlie is between about 0.002 and 0.004 inch.

14. A die for cutting and scoring a sheet material, said die being adapted for mounting in a suitable press and comprising a pair of matched, co-acting metallic die plates, each of said plates being all of one homogeneous piece and having working elements forming a predetermined pattern and formed integrally with the body of the plate and standing in very shallow relief in the form of lands above the main body of the plate in precise register to co-act with working elements on the other of said plates when the plates are in operating position, the working elements on one of said plates including a relief portion constituting a male scoring element of length equal to the length of a proposed score line to be formed in the sheet material, of width between about 0.8 and 1.5 times the thickness of said sheet material and of height between about 0.5 and 1.1 times the thickness of the sheet material, the working elements of said one die plate also including a relief portion which constitutes the first of a pair of co-acting sheet-severing members for producing a cut line in said sheet material, the working elements of the other of said die plates including a female scoring element comprising a spaced pair of relief portions defining a groove positioned to co-act with said male scoring element, said groove being of width between about 2.5 and 3.5 times the thickness of the sheet material and of depth at least substantially equal to the height of said male scoring element, the working elements of said other die plate also including a relief portion which constitutes the second of said pair of sheet-severing members, said sheet-severing members being disposed along a line where the sheet material is to be severed and being positioned in the horizontal relation with respect to each other between a spacing of about 0.2 times the thickness of said sheet material and an overlap of about 0.5 times such thickness, the overall thickness of at least one of said die plates being less than about 0.04 inch.

15. A die for forming a pattern of lines of severance in a sheet material, said die being adapted for mounting in a die press and comprising a pair of co-acting die plates, each of said die plates being all of one homogeneous piece and including sheet severing elements in the form of narrow lands on both sides thereof standing above the surface of the main body of the plate in very shallow relief, said sheet-severing elements being disposed along the lines where the sheet material is to be severed and so positioned on the respective plates that when the die is in operating position a minor portion of a sheet-severing element on one of said plates overlies a minor portion of a co-acting sheet-severing element on the other of said plates.

16. A die according to claim 15 wherein the extent of such overlie is between about 0.002 and 0.004 inch.

References Cited in the file of this patent
UNITED STATES PATENTS

| | | |
|---|---|---|
| 259,416 | Munson et al. | June 13, 1882 |
| 2,524,962 | Dalsemer | Oct. 10, 1950 |
| 2,743,629 | Pellegrino et al. | May 1, 1956 |
| 2,765,716 | Anderson | Oct. 9, 1956 |
| 2,817,273 | Phillips et al. | Dec. 24, 1957 |

UNITED STATES PATENT OFFICE
CERTIFICATE OF CORRECTION

July 28, 1964

Patent No. 3,142,233

Robert H. Downie

It is hereby certified that error appears in the above numbered patent requiring correction and that the said Letters Patent should read as corrected below.

Column 5, line 37, for "103b" read -- 103f --; line 40, for "101F" read -- 101f --; column 7, line 14, strike out "which", and insert the same after "FIGURE 8a," in line 15; same column 7; column 10, line 16, after "claim 1" insert -- wherein --; line 63, for "plates" read -- die members --; column 11, line 4, for "the", first occurrence, read -- in --.

Signed and sealed this 8th day of December 1964.

(SEAL)
Attest:

ERNEST W. SWIDER
Attesting Officer

EDWARD J. BRENNER
Commissioner of Patents